United States Patent
Parodi et al.

[15] 3,666,231
[45] May 30, 1972

[54] SEALED VALVE WITH ELECTROMAGNETIC ACTION

[72] Inventors: Luciano Parodi, Turin; Giancarlo Ghia, Carmagnola, both of Italy

[73] Assignee: Fiat Societa per Azioni, Turin, Italy

[22] Filed: Jan. 28, 1970

[21] Appl. No.: 6,490

[30] Foreign Application Priority Data

Mar. 10, 1969 Italy.................................50920 A/69

[52] U.S. Cl..............................251/129, 251/52, 251/137, 251/297
[51] Int. Cl.........................................................F16k 31/06
[58] Field of Search.................251/137, 129, 50, 51, 52, 297

[56] References Cited

UNITED STATES PATENTS

| | | |
|---|---|---|
| 2,835,468 | 5/1958 | Sparks....................................251/129 |
| 3,079,947 | 3/1963 | Hunt et al. ..........................251/137 X |
| 3,190,608 | 6/1965 | Hassa..................................251/137 X |
| 3,389,355 | 6/1968 | Schroeder..........................251/137 X |
| 3,417,784 | 12/1968 | Cowan................................251/137 X |

*Primary Examiner*—Arnold Rosenthal
*Attorney*—Sughrue, Rothwell, Mion, Zinn & Macpeak

[57] ABSTRACT

A main conduit through which fluid flows has a hollow transverse protrusion sealed to it. A gate-type closure member is slidable from the protrusion into the conduit to block it. A magnetic core is connected to the closure member and slides in the protrusion cavity. The body of the protrusion is non-magnetic. At least three winding surround the protrusion body and are selectively excited to open and close the valve by moving the core and with it the closure member. Latch-type rockers are provided to lock the closure member in one of its positions.

2 Claims, 1 Drawing Figure

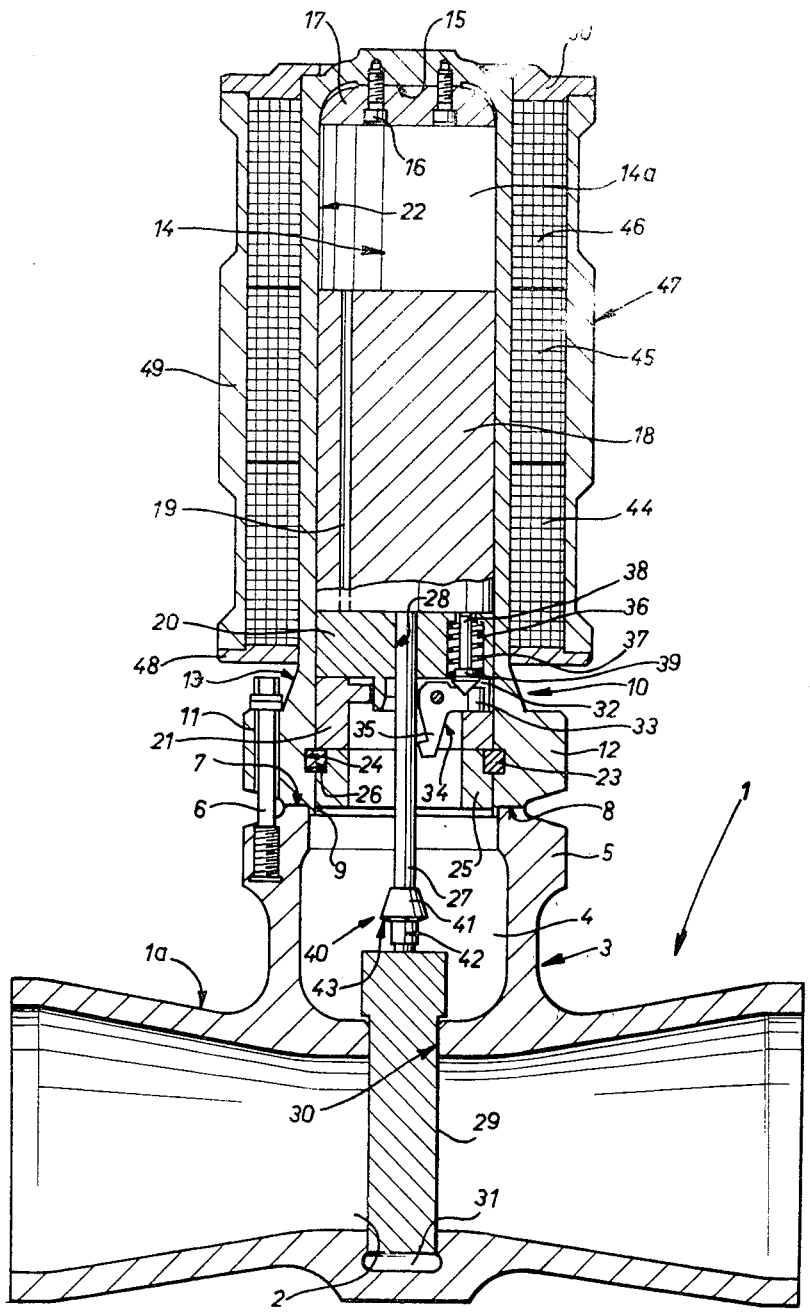

SEALED VALVE WITH ELECTROMAGNETIC ACTION

This invention relates to a sealed valve with electromagnetic action suitable for operation by remote control to regulate the flow of fluids which must remain isolated from the atmosphere and in which leakage cannot be allowed.

The total sealing required in valves of this type is due to the fact that they are commonly used to control the flow of fluids that are corrosive or radioactive or explosive when exposed to the atmosphere and which are usually very costly.

Moreover it is required of such valves that they should operate in working conditions of high pressure and temperature, that they should operate smoothly and that they should be able to control closure elements of large dimensions.

In the past attempts have been made to make valves meeting such requirements by moving the closure elements by electromagnetic mechanisms such as an electric motor connected to the closure element by a rack and pinion coupling. In such devices the sealing is obtained by a mechanical seal on the control shaft of the closure element. Total sealing is not obtained because it is not possible to obtain a perfect mechanical seal. Moreover such valves have the disadvantage of not allowing high operational speeds unless bulky motors of large power are used.

Another type of valve now in use to control fluids that are dangerous or costly comprises a hydraulic piston connected by means of a shaft to the closure element, the piston movement being obtained by means of a slide distributor connected downstream and upstream of the piston. Even in valves of this type there is a mechanical seal on the control shaft of the closure member, and it is not possible to prevent the fluid controlled by the valve from penetrating into the housing of the distributor and mixing with the fluid actuating the piston. To prevent the outflow of dangerous fluids, it is necessary to ensure that even the auxiliary operating valves of the distributor are totally sealed.

This invention, in order to avoid such disadvantages, provides a sealed valve comprising in combination a conduit through which fluid is adapted to flow; a cavities transverse protrusion sealed to the conduit; a closure member slidable between an open position in which it is at least predominantly contained in the cavity of the protrusion and a closed position in which it closes the conduit; a ferromagnetic core connected to the closure member and housed slidably in the cavity of the protrusion, at least that part of the protrusion which houses the core being of non-magnetic material; and at least three electrical windings surrounding different zones of the length of the protrusion and adapted to be selectively excited to displace the core and move the closure member between its open and closed positions.

Other features and advantages of the invention will be clear from the following description, provided with reference to the accompanying drawing showing a longitudinal sectioned view through a sealed valve according to the present invention.

In the drawing, 1 indicates a conduit in which flows the fluid to be controlled. The conduit 1 has a restriction 2 at which, on the exterior wall 1a of the conduit, is formed a vertical cylindrical protrusion 3, that is solid with the conduit 1 and has a cylindrical internal cavity 4. On the external surface of the protrusion 3 is an annular flange 5. The protrusion 3 has at its top a flat annular surface 7 on which is supported a hollow body 10 by means of a surface 8, also of annular shape and having on its interior a circular centralizing nib 9.

The body 10 is cylindrical and is connected with its axis vertical to the protrusion 3 by means of studs 6 which extend through a plurality of holes 11 formed in an annular flange 12 on an external surface 13 of the body 10, the studs screwing into holes in the flange 5. The connection can be totally sealed by means of a holding weld.

The body 10 has, internally and along its whole length, a cylindrical cavity 14 with a vertical axis, to the upper wall 15 of which a stop member 17 is connected by means of a plurality of screws 16, the member 17 limiting the upward stroke of a magnetic core 18 held slidably in the cavity 14.

The core 18 has a calibrated hole 19. The stroke of the core 18 is limited downwardly by a second stop member 20 of cylindrical shape, which with the stop member 17 defines a cylinder 14a.

The stop member 20 rests on a ring 21 in contact with the internal surface 22 of the cavity 14. The ring 21 rests in turn on two semi-annular elements 23 fixed in a circular cavity 24 of rectangular section formed in the surface 22 of the cavity 14.

To connect the ring 21 solidly to the surface 22 of the cavity 14, under the semi-annular elements 23 is disposed a third ring 25, in contact with the surface 22, and having in its external surface at its top a circular groove 26 of rectangular section in which the semi-annular elements 23 fixed. The upper surface of the ring 25 contacts the lower surface of the ring 21 to which it is connected by means of screws (not shown).

At the center of the base of the core 18 is slidably connected a vertical rod 27 which is mounted slidably in a hole 28 formed along the axis of the stop member 20. At the lower end of the rod 27 is connected a closure element 29 in the form of a gate, which is mounted slidably and sealingly in an aperture 30 formed in the wall of the conduit 1 at the restriction 2.

In the interior of the conduit 1, opposite the aperture 30 and in the same plane as it, is a groove 31 into which the lower part of the gate 29 can extend to close the conduit 1 totally. The ring 21 has, at its top surface, a plurality of radial incisions 32 in each of which is inserted an arm 33 of a rocker 34. Each rocker 34 is pivoted on the ring 21 and is able to rotate in a plane passing through the axis of the rod 27. Each rocker 34 has a second arm 35 disposed vertically downwardly and provided with a hook, the arms 34 and 35 being set at rigid angles to each other.

In the stop member 20, at the incision 32 of the ring 21, are formed several circular cavities 36 with vertical axes in each of which is mounted a helical spring 37 concentric with a piston shaft 38 having at its lower end a foot 39. The foot 39 biases the top surface of the arm 33 of a rocker 34 in such a way as to hold the hooked arm 35 slightly away from the rod 27. The cavities 36 may extend through the stop member 20 to provide a path for fluid into the cylinder 14a.

The rod 27, hear its lower end, has a boss 40 solidly connected on the rod and having an upper part 41 of frusto-conical shape, narrowing upwardly, and a lower cylindrical part 42. Between the parts 41 and 42 the boss 40 has in inclined shoulder 43 with which the hooked arms 35 cooperate to hold the gate 29 in its fully raised position, the arms 35 being adapted to counter-rotate to free the boss 40 when a sufficient downward force is exerted on the rod 27. To displace the core 18 in the cylinder 14a, there are provided externally of the cylinder 14a, on the surface 13 of the body 10, three toroidal windings 44, 45 and 46, all similar to each other and whose combined height is slightly greater than that of the cylinder 14a. They are connected in an electrical circuit (not shown) which includes a source of D.C. power and switches which allow one or more of the windings to be excited selectively.

The windings 44, 45 and 46 are contained in a cylindrical box 47 comprising a base 48 with an annular surface fixed on the body 10, a lateral cylindrical wall 49, and a cover 50, it too having an annular surface and resting on the cylindrical wall 49 and on the top of the body 10. When electrical current passes through one of the windings 44, 45 and 46, it generates a magnetic field by means of which it is possible to move the core 18 upwards or downwards in the cylinder 14a.

To be able to exploit to the maximum the forces generated by the magnetic field, it is necessary that the greatest possible number of lines of force pass through the core 18. For this purpose the stop members 17 and 20 which limit the cylinder 14a in which slides the core 18 are formed of ferromagnetic material, while the body 10 is formed of non-magnetic material. In this way the lines of force tend to travel along the axis of the cylinder 14a and are not dispersed in the body 10.

Finally, the box 47 which surrounds the windings 44, 45 and 46 is formed of ferromagnetic material and operates as a closure path for the magnetic flux.

The action of the valve takes place in the following way:

When the gate 29 is lowered to close the conduit 1, opening operation is carried out in two phases:

In the first phase,
   a. the windings 45 and 46 are excited. The magnetic forces they generate act on the core 18 to attract it upwardly in the first phase of its stroke.

In the second phase,
   b. only the winding 46 is excited. The magnetic forces attract the core still further upward to complete its stroke.

The division of the opening operation in two separate phases ensures that in all positions of the core 18 during its opening stroke there is adequate force to actuate the valve. Such force includes the force necessary to open the gate 29 against the pressure difference existing upstream and downstream of the gate 29, the force necessary to raise the weight of the gate 29, the rod 27 and the core 18, the force necessary to insert the hooks of the arms 35 in the shoulder 43 of the boss 40 and the force necessary to overcome the friction of the moving parts.

When the gate 29 is open, closing is carried out in two phases:

a. In the first phase, the windings 45 and 44 are excited. The magnetic force exerted on the core 18 attracts it downward for part of its stroke.

b. In the second phase, only the winding 44 is fed. The magnetic force exerted on the core 18 completes the closing stroke.

The force which must be generated by the magnetic force during closing includes the force necessary to free the boss 40 from the hooked arms 35 by counter-rotating them to cause springs 37 to yield, the force necessary to close the gate 29 against the resistance of the moving fluid in the conduit 1 and the pressure difference created upstream and downstream of the gate 29, and the force necessary to overcome the friction of the moving parts.

The valve is totally sealed even if the tolerances between the aperture 30 and the gate 29 are not extremely strict. In fact when the gate 29 is lowered, the pressure in the conduit 1 upstream traps the gate against the downstream wall of the aperture 30. Although, only a very small space should exist between the gate 29 and the upstream wall of the aperture 30, fluid enters the cavity 4 but cannot pass into the part of the conduit 1 downstream of the gate 29. Once having entered the cavity 4, the fluid passes through the gap existing between the walls of the hole 28 formed in the stop member 20 and the rod 27 and if need be through the cavities 36, and enters the cylinder 14a through the hole 19. In this way it is possible to use the same fluid to carry out a braking action during the functioning of the valve to achieve the desired smooth movement of the gate 29. For this purpose the hole 19 is of such dimensions as to have a hydraulic resistance adapted to regulate the movement of the core 18 in the manner desired.

What we claim is:

1. A sealed valve comprising in combination, a conduit through which fluid is adapted to flow; a cavitied transverse protrusion sealed to the conduit; a closure member slidable between an open position in which it is at least predominantly contained in the cavity of the protrusion and a closed position in which it closes the conduit; a ferro-magnetic core consisting of a single element connected to the closure member and housed slidably in the cavity of the protrusion, at least that part of the protrusion which houses the single core element being of non-magnetic material; at least three electrical windings surrounding different zones of the length of the protrusion and adapted to be selectively excited to displace the single core element and move the closure member between its open and closed positions; a rod connecting the core to the closure member, the rod having a boss on its surface, said valve further including means to mechanically lock said closure member in at least one of its open and closed positions, a plurality of rockers pivoted about fixed points and each having a hooked first arm adapted to engage the boss in one of its open and closed positions, means being provided to contact a second arm of the rocker and hold the rocker in the locked position of the hooked arm while the core remains in such one of its positions.

2. The valve of claim 1 in which the means to contact the second arm of each rocker comprises a member elastically mounted in the protrusion and biased to hold the rocker in the locked position, the member being yieldable against its bias on excitation of the windings.

* * * * *